US009026043B2

(12) United States Patent
Fang et al.

(10) Patent No.: US 9,026,043 B2
(45) Date of Patent: May 5, 2015

(54) SYSTEM ARCHITECTURE FOR HIGH DENSITY SATELLITE CAPACITY FOOTPRINT WITH FLEXIBLE ANTENNA SIGNAL ROUTING CAPABILITIES

(71) Applicant: Hughes Network Systems, LLC, Germantown, MD (US)

(72) Inventors: Russell Fang, Potomac, MD (US); Rajeev Gopal, North Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 183 days.

(21) Appl. No.: 13/864,213

(22) Filed: Apr. 16, 2013

(65) Prior Publication Data

US 2013/0273840 A1 Oct. 17, 2013

Related U.S. Application Data

(60) Provisional application No. 61/625,060, filed on Apr. 16, 2012.

(51) Int. Cl.
*H04B 7/185* (2006.01)

(52) U.S. Cl.
CPC ........ *H04B 7/18513* (2013.01); *H04B 7/18515* (2013.01)

(58) Field of Classification Search
USPC ............................... 455/3.02, 12.1, 13.3, 427
See application file for complete search history.

(56) References Cited

U.S. PATENT DOCUMENTS

| | | | | |
|---|---|---|---|---|
| 5,907,541 | A * | 5/1999 | Fairholm et al. | 370/316 |
| 7,423,987 | B2 * | 9/2008 | Anderson et al. | 370/316 |
| 2008/0146145 | A1 | 6/2008 | Pateros et al. | |

FOREIGN PATENT DOCUMENTS

| | | | |
|---|---|---|---|
| EP | 1058410 | A2 | 12/2000 |
| EP | 1085680 | A2 | 3/2001 |
| EP | 1965511 | A1 | 9/2008 |

OTHER PUBLICATIONS

EPO, "Extended European Search Report", EP13163901.5, Jan. 21, 2015.

* cited by examiner

*Primary Examiner* — Dominic E Rego

(74) *Attorney, Agent, or Firm* — Potomac Technology Law, LLC

(57) ABSTRACT

A transmission and reception spot beam antenna is provided. A first transponder is configured to receive communications signals within a first receive spot beam and to transmit the communications signals within a first transmit spot beam. A second transponder is configured to receive reach-back signals within a second receive spot beam and to process the reach-back signals. A link between the second transponder and the first transponder passes the reach-back signals to the first transponder for transmission within the first transmit spot beam. A third transponder is configured to receive communications signals within a third receive spot beam and to transmit the communications signals within a third transmit spot beam. A link between the first transponder and the third transponder passes the communications signals to the third transponder, wherein the third transponder is configured to process the communications signals for transmission within the third transmit spot beam.

10 Claims, 6 Drawing Sheets

SYSTEM ARCHITECTURE FOR HIGH DENSITY SATELLITE CAPACITY FOOTPRINT WITH FLEXIBLE ANTENNA SIGNAL ROUTING CAPABILITIES

RELATED APPLICATIONS

This application is related to and claims the benefit of priority under 35 U.S.C. §119(e) to U.S. Provisional Application Ser. No. 61/625,060 filed 16 Apr. 2012, the entirety of which is incorporated herein by reference.

FIELD

The present invention relates to satellite communications systems, and more particularly to satellite architectures for flexibility in satellite capacity footprints and data transmission.

BACKGROUND

Satellite communications has experienced impressive demand and growth over the last couple of decades in commercial, governmental, and military environments. Satellite communications have become a prevalent part of data communications throughout the world.

The design of a satellite system, however, poses various challenges with respect to maximization of throughput and associated design issues relating to the optimization of bandwidth usage, power consumption, latency, error rates, failure recovery, and the like. Further, as business models push for ever increasing capacity in a satellite system (e.g., based on the investment expense and time to market for a new satellite system or even an additional satellite), system requirements drive demands for larger and more robust satellite designs. Larger satellites, however, pose even more difficult design challenges, such as in the areas of antenna designs that optimize bandwidth usage and minimize co-channel interference. Detailed traffic studies and forecasts are required for antenna system designs in order to optimize the layout of antenna elements for a beam and frequency reuse pattern that optimizes the capacity of the satellite. Further, such antenna designs generally must be fixed and customized for a particular geographic region in order to design an optimal beam pattern, making them somewhat inflexible for relocation. Also, in cases where traffic patterns are difficult, if not impossible, to forecast, large antenna system designs for such large capacity satellites are correspondingly difficult, if not impossible, to optimize.

Additionally, as the number of beams increases, the challenge, complexity and expense of designing a flexible antenna system that achieves an acceptable level of beam isolation and co-channel interference also increases. In many cases of large satellites, multiple large antenna systems are required to achieve acceptable isolation and co-channel interference. Moreover, as the complexity increases, the expense and time-to-market for a new satellite system also increases. Further, satellite system designs become larger and more complex, the system becomes less forgiving with respect to fault tolerance, which complicates manufacturability and time to manufacture.

What is needed, therefore, is a satellite system architecture that provides for high density capacity allocations in smaller geographic regions. What is further needed through such an architecture is flexibility in capacity allocation and beam footprints for instances where traffic forecasts are difficult or relatively impossible, and where traffic demands significantly vary over time. Additionally, such a satellite system architecture should be less complex and less expensive and time consuming to design and manufacture.

SOME EXAMPLE EMBODIMENTS

The present invention advantageously addresses the needs above, as well as other needs, by providing a satellite system architecture for a smaller and less complex satellite design, providing for flexible high density capacity allocation in a smaller footprint, including a loop-back transponder configuration for single-hop, intra-cell mesh connectivity, and a direct-through transponder configuration for single-hop direct gateway connectivity.

According to an example embodiment, a transmission and reception spot beam antenna apparatus comprises a first transponder configured to receive one or more wireless communications signals from within a first receive spot beam of the transponder and to transmit one or more of the wireless communications signals within a first transmit spot beam of the transponder. The apparatus further comprises a second transponder configured to receive one or more reach-back signals from within a second receive spot beam and to process the reach-back signals for transmission. A link between the second transponder and the first transponder is configured to pass one or more of the reach-back signals processed by the second transponder to the first transponder for transmission within the first transmit spot beam. By way of example, with respect to the transmission and reception spot beam antenna apparatus: the one or more wireless communications signals received by the first transponder from within the first receive spot beam comprise user terminal communications signals received via one or more communications channels of the first receive spot beam; the one or more reach back signals received by the second transponder from within the second receive spot beam comprise gateway terminal reach-back signals intended for transmission to user terminals via one or more communications channels of the first transmit spot beam; and the link between the second transponder and the first transponder facilitates direct transmission of the gateway terminal reach-back signals, via the transmission and reception spot beam antenna apparatus, via the one or more communications channels of the first transmit spot beam. More specifically, according to an example embodiment, the first transponder comprises a first receive amplifier section, a first filter/down-converter processing section and a first transmit processing section, and the second transponder comprises a second receive amplifier section and a second filter/down-converter processing section, wherein the second filter/down-converter processing section is configured to perform the processing of the one or more reach-back signals being passed on to the first transponder. The link between the second transponder and the first transponder is configured to pass the reach-back signals (being passed on to the first transponder) from the second filter/down-converter processing section of the second transponder to the first transmit processing section of the first transponder for the transmission within the first transmit spot beam.

According to a further example embodiment, the transmission and reception spot beam antenna apparatus further comprises one or more additional transponders, each being configured to receive one or more wireless communications signals from within a respective receive spot beam of the transponder and to transmit one or more of the wireless communications signals within a respective transmit spot beam of the transponder. One or more additional links are provided, each additional link being between the second transponder and a respective one of one or more of the additional transponders, wherein each additional link is configured to pass one or more of the reach-back signals processed by the second transponder to the respective additional transponder for transmission within the transmit spot beam of the respective additional transponder. More specifically, according to an example embodiment, each of the additional transponders comprises a respective receive amplifier section, a respective filter/down-converter processing section and a respective transmit processing section, and the second transponder comprises a plurality of filter/down-converter processing paths, wherein each filter/down-converter processing path is associated with a respective one of the additional links and is configured to process the reach-back signals being passed on to the respective additional transponder via the respective additional link. Each of the additional links is configured to pass the reach-back signals (being passed on to the respective additional transponder) from the respective filter/down-converter processing path to the transmit processing section of the respective additional transponder for the transmission within the transmit spot beam of the respective additional transponder.

According to a further example embodiment, the transmission and reception spot beam antenna apparatus further comprises a third transponder configured to receive one or more wireless communications signals from within a third receive spot beam of the transponder and to transmit one or more of the wireless communications signals within a third transmit spot beam of the transponder. A link between the first transponder and the third transponder, wherein the link between the first transponder and the third transponder is configured to pass one or more of the wireless communications signals received by the first transponder to the third transponder. The third transponder is further configured to process the wireless communications signals (received via the link) for transmission within the third transmit spot beam. By way of example, with respect to the transmission and reception spot beam antenna apparatus: the one or more wireless communications signals received by the third transponder from within the third receive spot beam comprise user terminal communications signals received via one or more communications channels of the third receive spot beam; the wireless communications signals received by the first transponder and passed on to the third transponder comprise user terminal reach-back signals intended for transmission to one or more reach-back gateway terminals via one or more communications channels of the third transmit spot beam; and the link between the first transponder and the third transponder facilitates direct transmission of the user terminal reach-back signals, via the transmission and reception spot beam antenna apparatus, via the one or more communications channels of the third transmit spot beam. More specifically, according to an example embodiment, the first transponder comprises a first receive amplifier section, a first filter/down-converter processing section and a first transmit processing section, and the third transponder comprises a third receive amplifier section, a third filter/down-converter processing section, a fourth filter/down-converter processing section, and a third transmit processing section. The link between the first transponder and the third transponder is configured to pass the wireless communications signals (being passed on to the third transponder) from the first receive amplifier section of the first transponder to the fourth filter/down-converter processing section of the third transponder, and the fourth filter/down-converter processing section of the third transponder is configured to process the wireless communications signals passed on from the first transponder and to forward the processed signals to the third transmit processing section for the transmission within the third transmit spot beam.

According to a further example embodiment, the transmission and reception spot beam antenna apparatus further comprises one or more additional transponders, each being configured to receive one or more wireless communications signals from within a respective receive spot beam of the transponder and to transmit one or more of the wireless communications signals within a respective transmit spot beam of the transponder. One or more additional links are provided, each additional link being between a respective one of one or more of the additional transponders and the third transponder, wherein each additional link is configured to pass one or more of the wireless communications signals received by the respective additional transponder to the third transponder for transmission within the third transmit spot beam. The third transponder is further configured to process the wireless communications signals (received via each of the additional links) for transmission within the third transmit spot beam. More specifically, according to an example embodiment, the first transponder comprises a first receive amplifier section, a first filter/down-converter processing section and a first transmit processing section, and the third transponder comprises a third receive amplifier section, a third filter/down-converter processing section, and a third transmit processing section. The third transponder further comprises a plurality of filter/down-converter processing paths, wherein each filter/down-converter processing path is associated with a respective one of the additional links and is configured to process the wireless communications signals passed on from the respective additional transponder via the respective additional link. Each of the additional links is configured to pass the wireless communications signals (being passed on to the third transponder) to the respective filter/down-converter processing section of the third transponder associated with the additional link, and each of the filter/down-converter processing sections of the third transponder is configured to process the wireless communications signals passed on from the respective additional transponder and to forward the processed signals to the third transmit processing section for the transmission within the third transmit spot beam.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An architecture for a flexible high density satellite capacity allocation in a smaller footprint, including a loop-back transponder configuration for single-hop, intra-cell mesh connectivity, and a direct-through transponder configuration for single-hop direct gateway connectivity, is described. In the following description, for the purposes of explanation, numerous specific details are set forth in order to provide a thorough understanding of the invention. It is apparent, however, that the invention may be practiced without these specific details or with an equivalent arrangement. In other instances, well known structures and devices are shown in block diagram form in order to avoid unnecessarily obscuring the invention.

Figure 1A:
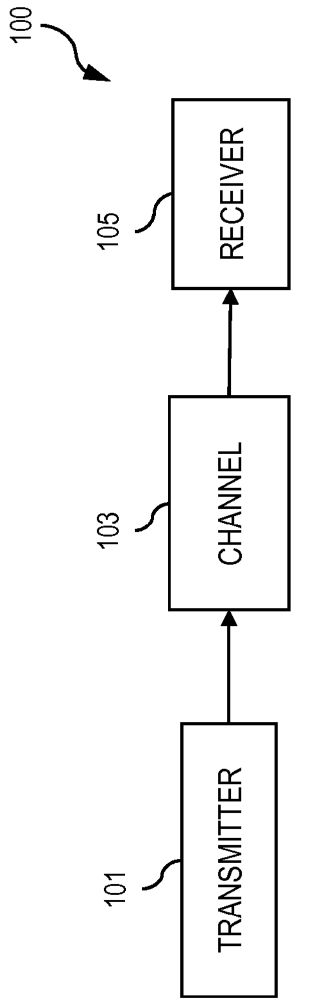
FIG. 1A illustrates a communications system, in accordance with example embodiments.

FIG. 1A illustrates a communications system 100 capable of employing convolutional coding for DVB-S2 PLS coding according to various example embodiments. With reference to FIG. 1, a digital communications system 100 includes one or more transmitters 101 (of which one is shown) that generate signal waveforms across a communication channel 103 to one or more receivers 105 (of which one is shown). In this discrete communications system 100, the transmitter 101 has a signal source that produces a discrete set of data signals, where each of the data signals has a corresponding signal waveform. These signal waveforms are attenuated, or otherwise altered, by communications channel 103. To combat noise and other issues associated with the channel 103, coding may be utilized. For example, forward error correction (FEC) codes can be employed.

Figure 1B:
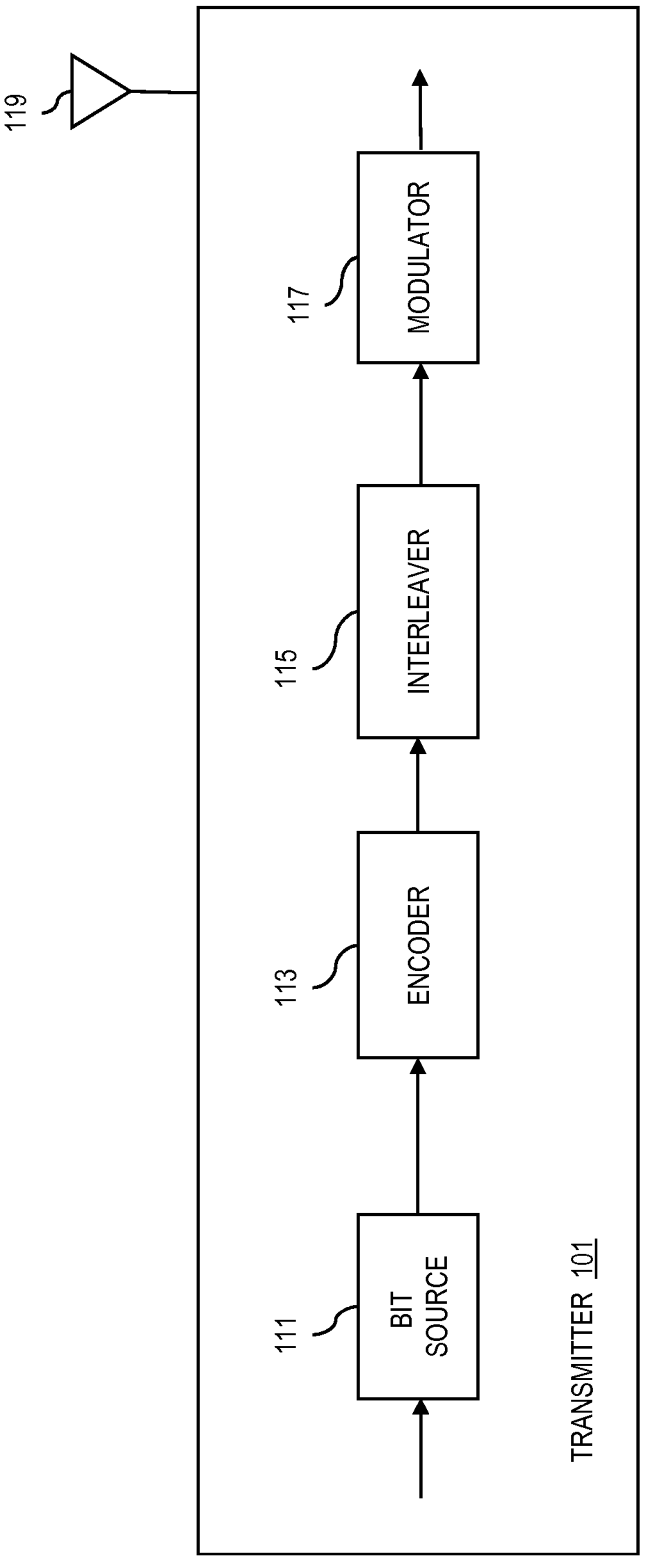
FIG. 1B illustrates a block diagram of an example transmitter of the digital communications system of FIG. 1A, in accordance with an example embodiment.

FIG. 1B illustrates a block diagram of an example transmitter 101 of the digital communications system 100 of FIG. 1A. In this embodiment, the transmitter 101 is equipped with a channel encoder (e.g., an FEC encoder) 113 that accepts input from an bit information source 111 and outputs coded stream of higher redundancy suitable for error correction processing at the receiver 105. Essentially, the encoder 113 generates the coded stream, and passes it to an interleaver 115, which reorders the sequence of symbols or bits from the encoder 113 in a predetermined manner. The interleaved signal is fed to a modulator 117 (e.g., in a satellite communications system), which maps the encoded messages from encoder 113 to signal waveforms that are transmitted over the communication channel 103 to a satellite via a transmit antenna 119.

Figure 2:
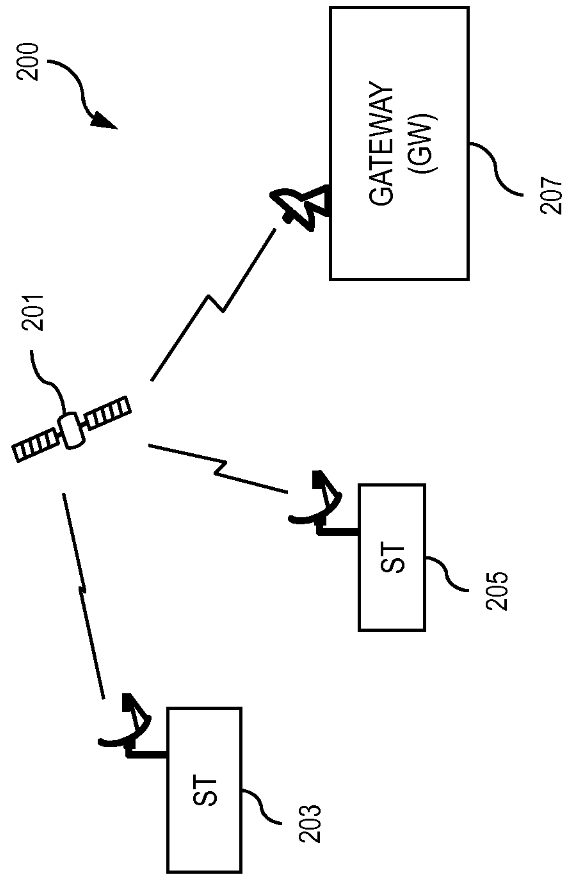
FIG. 2 illustrates a satellite communications system, in accordance with example embodiments.

FIG. 2 illustrates a satellite communications system according to various example embodiments. With reference to FIG. 2, an example satellite communications system 200 is capable of supporting communication among terminals with varied capabilities. Satellite communications system 200 includes a satellite 201 that supports communication among multiple satellite terminals (STs) 203, 205 and a gateway (GW) 207. In a traditional bent-pipe system of an example embodiment, the satellite 201 operates as a repeater or bent pipe, and communications between the STs 203, 205 are transmitted over a double-hop path. For example, in a communication from ST 203 to ST 205, over the first hop, the communication is transmitted, via the satellite, from the ST 203 to the GW 207. The GW 207 decodes the communication and determines the destination ST 205. The GW 207 then appropriately addresses and repackages the communication, encodes and modulates it, and transmits the communication over the second hop, via the satellite, to the destination ST 205. Accordingly, the satellite of such a system acts as a bent pipe or repeater, transmitting communications between the HUB 211 and the STs 203, 205.

Further, the satellite 201 includes a loop-back transponder architecture that supports direct, single-hop mesh connectivity between two STs 203 and 205 located within a common transponder beam or cell. The data transmissions of one ST 203 are looped-back via the satellite, and transmitted down within the same cell. Such transmissions can thereby be decoded and consumed by an appropriately equipped ST 205 located within that cell. The satellite 201 further includes a direct-through transponder architecture, whereby transmissions over a particular beam (to and from a particular cell covered by that beam) are passed directly through to the beams servicing one or more other cells. For example, such a direct-through architecture supports direct communication between the GW 207 (located within the particular beam serviced by the direct-through transponder—e.g., the reach-back GW beam) and STs 203 and 205 within the other cells.

According to an example embodiment, an architecture for a satellite communications system is provided, which employs a relatively small communications satellite with a limited number of spot-beam antennas, to achieve greater flexibility and higher density coverage within a targeted area. Each antenna may be configured for either a cluster of a plurality of individual spot-beams or a single spot-beam. The number and configuration of the antennas is determined based on a desired number of individual coverage areas, and a desired coverage configuration for each coverage area. Further, for an antenna configuration comprising a cluster of spot-beams, the number of spot-beams will be determined based on a desired coverage configuration within the coverage area of the antenna, taking into consideration the total available bandwidth and a maximization of the bandwidth, subject to the acceptable co-channel interference and polarization isolation between beams. For further flexibility in the configuration of the coverage, the spot-beams may be steerable. For example, either the antenna reflector may be configured with a steering mechanism, or the antenna elements themselves may be steerable. Alternatively, for maximum flexibility (with a tradeoff in complexity), the antenna reflector and the antenna elements may both be steerable.

Figure 3:
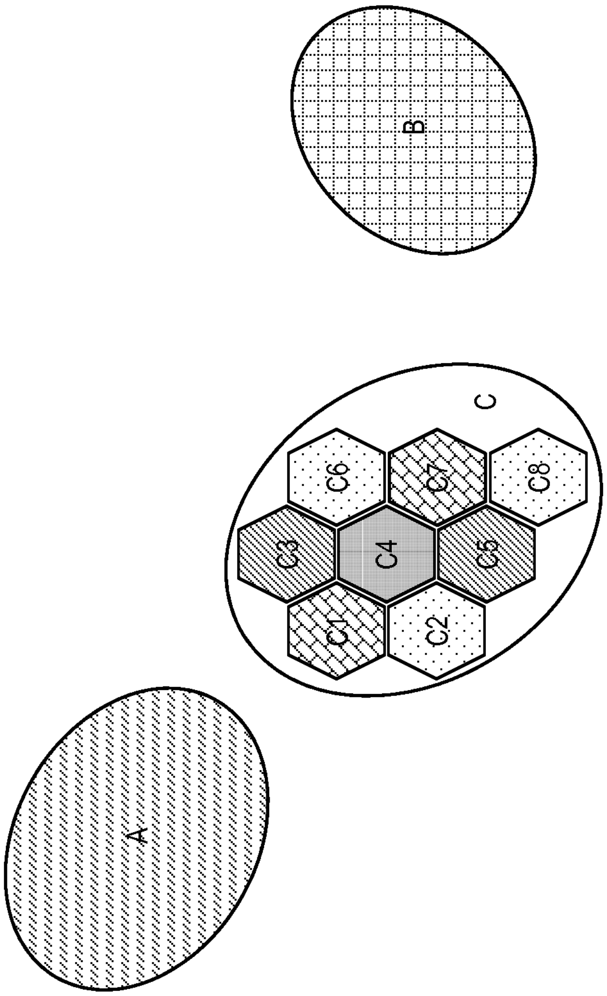
FIG. 3 illustrates a beam pattern for a satellite architecture, in accordance with an example embodiment.

For example, FIG. 3 illustrates an example coverage scenario, via a communications satellite 201, in accordance with an example embodiment, where the satellite includes three steerable antennas. One antenna provides a single spot-beam represented by the coverage area A, a second antenna provides a single spot-beam represented by the coverage area B, and the third antenna provides a cluster of eight individual spot-beams (C1-C8) represented by the coverage area C. Each antenna may be steerable to provide the ability to move each of the coverage areas A, B and C independently or in unison, depending on the desired coverage area for each antenna independently and relative to the coverage areas of the other antennas.

According to a further example embodiment, the architecture of the spot-beam antennas facilitates both intra-beam communications within an individual spot-beam, and inter-beam communications between spot-beams. The intra-beam communications are accomplished through loop-back transponders of one example embodiment, which provides for single-hop mesh communications through a single-hop architecture, without the need for deploying a packet-switch or packet router in the satellite payload. The inter-beam communications between beams are accomplished through direct-through transponders of a further example embodiment, which provides for point-to-point or hub-and-spoke connectivity (e.g., for teleport and gateway applications). As one of skill in the art would recognize, the realization of mesh communications, without the deployment of a router or packet switch in the payload, achieves significant operation flexibility at substantially reduced cost and complexity.

Further, based on the size of the antenna, and the limited number of individual spot-beams, sufficient beam isolation can easily be achieved between adjacent beams, such that each beam is practically "orthogonal" to each other, without causing unacceptable interference. As illustrated in FIG. 4, for example, eight individual spot-beams (C1-C8) are provided within the coverage area C of the one satellite antenna. Accordingly, as illustrated by the fill-patterns of each individual spot-beam (each pattern reflecting a different frequency band/polarization), beams C1 and C3 each has only one potential interferer (beams C7 and C5, respectively), beam C2 has only two possible interferers (beams C6 and C8), and beam C4 has no potential interferers. Accordingly, the eight spot beams can be implemented in a single antenna reflector with sufficient isolation between antenna elements, and hence between individual spot-beams, to achieve acceptable isolation and levels of co-channel interference between beams.

Figure 4A:
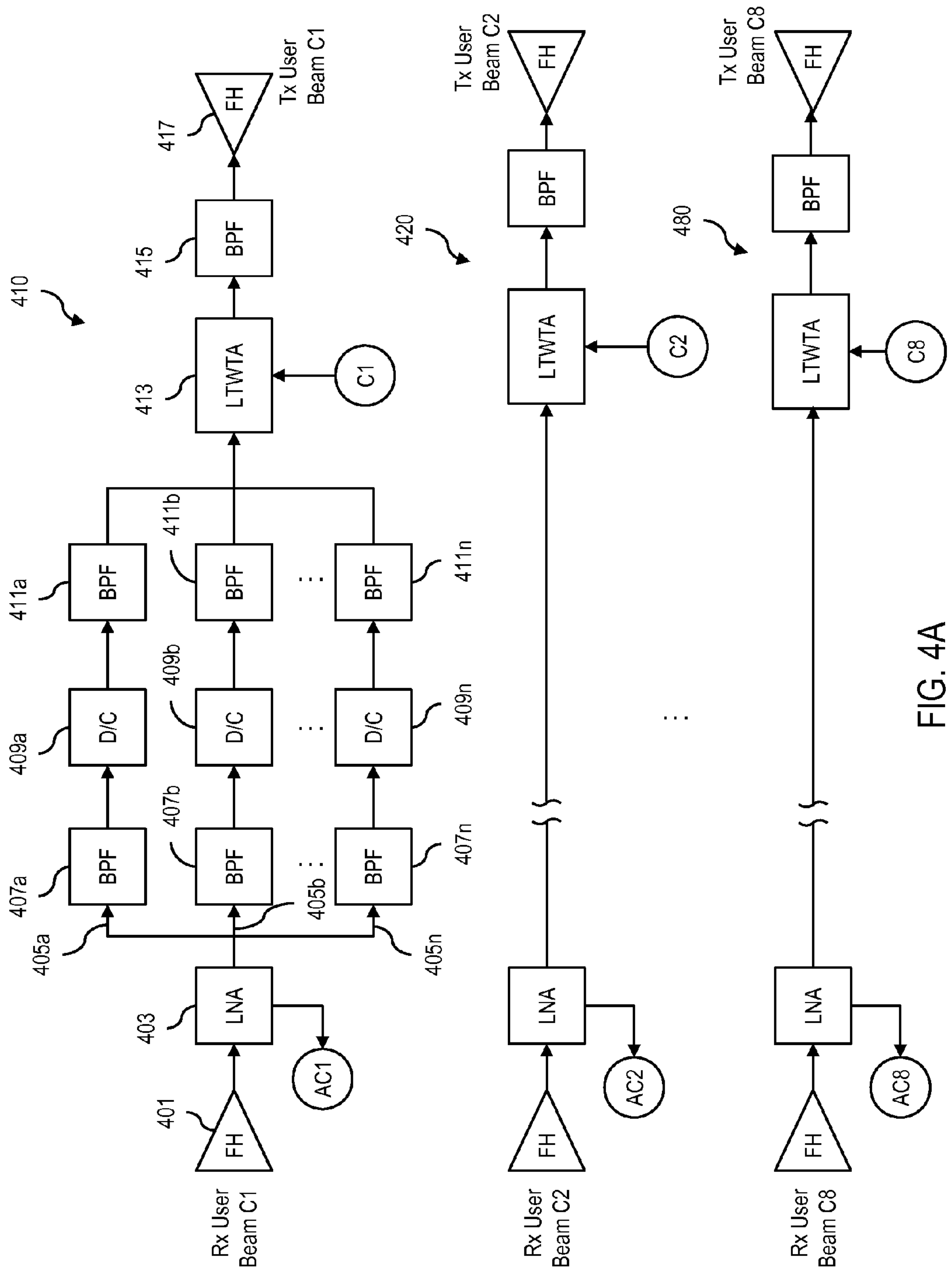
FIG. 4A illustrates a block diagram of a loop-back transponder architecture for intra-beam communications, in accordance with an example embodiment.
Figure 4B:
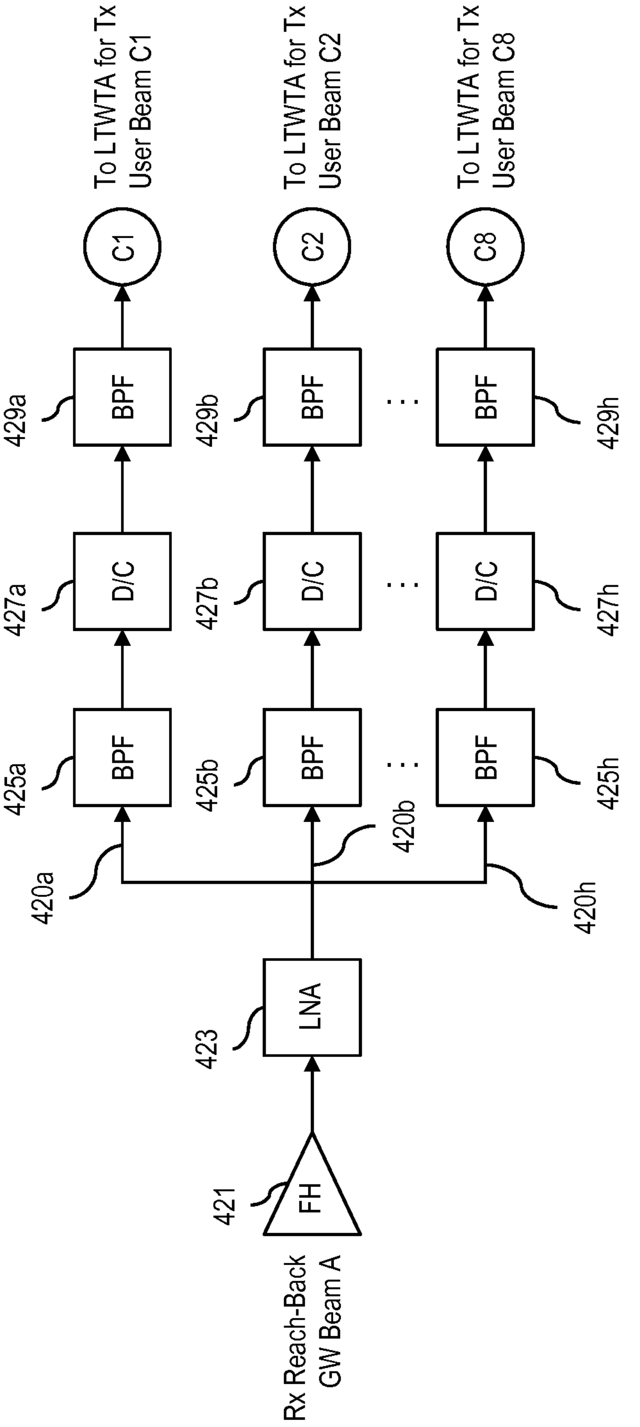
FIG. 4B illustrates a block diagram of a direct-through transponder architecture for Rx Reach-Back inter-beam communications, in accordance with an example embodiment.
Figure 4C:
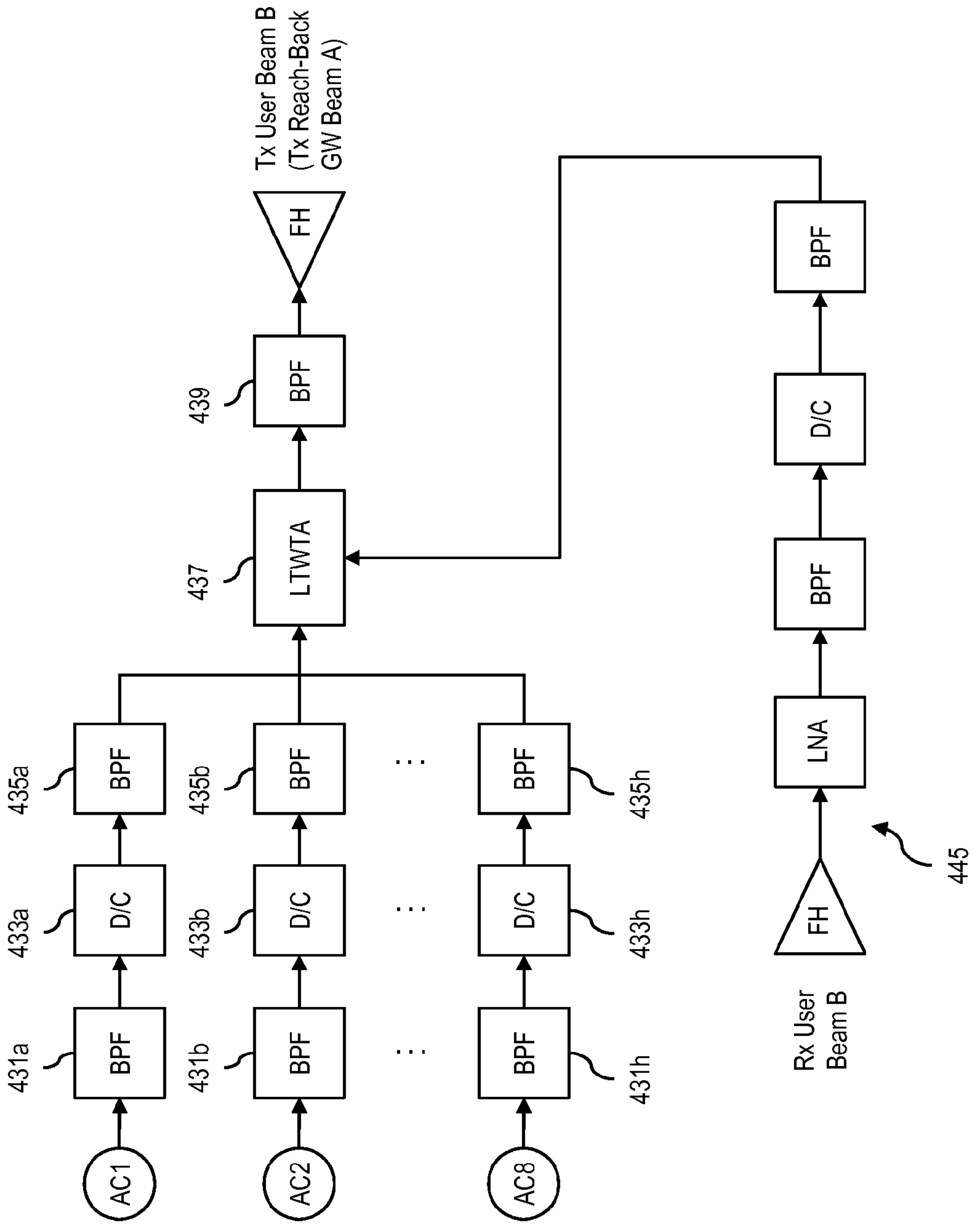
FIG. 4C illustrates a block diagram of a direct-through transponder architecture for Tx Reach-Back inter-beam communications, in accordance with an example embodiment.

FIGS. 4A to 4C illustrate antenna element or feed configurations according to example embodiments. According to an example embodiment, with reference to FIG. 4A, the intra-beam communications for the inroute signals received by the satellite are accomplished via a loop-back transponder path for each of the individual beams, where the inroute signals are received by the satellite via a particular receive beam, and are routed through the transponder for transmission via an outroute back down via the same beam or cell. For example, the receive (Rx) beam C1 (corresponding to spot-beam or cell C1 of FIG. 3) is received by the feed horn (FH) 401. The received beam C1 is fed into the low noise amplifier (LNA) 403. From the LNA 403, the signal is split amongst a number of paths or channels 405*a* to 405*n*. Each path comprises a channel filter or band pass filter to pull the desired channel signal, a downconverter to downconvert the signal (e.g., from 30 GHz to 20 GHz) and a band pass filter to filter out the undesired adjacent signals. As depicted in FIG. 4A, channels 405*a* to 405*n* comprise BPF 407*a* to 407*n,* D/C 409*a* to 409*n* and BPF 411*a* to 411*n,* respectively. The resulting channel signals are then fed into the amplifier 413 (e.g., a linear traveling wave tube amplifier), and then into a spectrum-limiting filter 415 (e.g., a band pass filter) to avoid interference with adjacent channels. The signal is then fed into the feed 417 for transmission as the Tx user beam C1 (also corresponding to spot-beam or cell C1 of FIG. 3). The Rx user beam C1 is thereby received by the satellite antenna, and the respective signals or channels are looped-back, and transmitted back to the same cell via the Tx user beam C1. Accordingly, a satellite terminal within the cell C1 can thereby perform a mesh data transmission, via a single-hop over the satellite, directly to a destination terminal within cell C1. A similar architecture is employed for each of the individual beams of the satellite antenna (410, 420, . . . , 480), whereby intra-beam loop-back communications would be available for appropriately equipped terminals within each of the individual beams or cells C1 through C8.

For example, an ST 203, located within the spot-beam or cell C1, can transmit data via channel 405*b.* The satellite will receive the data signal transmitted by the ST 203 via the Rx user beam C1, and transmit the data signal back down to cell C1 via the Tx user beam C1. A further terminal ST 205 within the cell C1 may then receive the data signal from the ST 203 via the Tx user beam C1. As would be recognized by one of skill in the art, the transmitting terminal ST 203 and the receiving terminal ST 205 must each be equipped with a protocol for encoding and decoding the data signals to facilitate the recognition and consumption of the data. Such protocols would be a matter of design choice and would be within the realm of one of ordinary skill in the art. Further, various encryption and security architectures could be employed to ensure that only the desired terminal(s) are capable of receiving and decoding the data transmissions—such as conditional access and shared key architectures—which would also be a matter of design choice and within the realm of one of ordinary skill in the art.

According to a further example embodiment, with reference to FIG. 4B, the inter-beam communications for inroute signals received by the satellite from an individual beam or cell are accomplished via a direct-through transponder path for the particular cell, where the inroute signals for that cell are received by the satellite via the respective receive beam, and are routed through the transponder for transmission via an outroute back down via a transmission beam serving a different cell (e.g., a reach-back inroute data signal received from a gateway (GW) of one cell, where the GW inroute is routed through the transponder for transmission via an outroute back down via a user beam of one or more different cells). For example, the receive (Rx) reach-back GW beam A (corresponding to spot-beam or cell A of FIG. 3) is received by the feed horn (FH) 421. The received beam A is fed into the low noise amplifier (LNA) 423. From the LNA 423, the signal is split amongst a number of paths or channels for each of the Tx user beams. Each path comprises a band pass filter to pull the desired channel signal, a downconverter to downconvert the signal and a band pass filter to filter out the undesired adjacent signals. As depicted in FIG. 4B, the channel 420*a* comprises BPF 425*a,* D/C 427*a* and BPF 429*a,* which corresponds to Tx user beam C1, and the channel 420*b* comprises BPF 425*b,* D/C 427*b* and BPF 429*b,* which channel corresponds to Tx user beam C2. The Rx reach-back configuration similarly includes a channel for each of the Tx user beams, with the last channel 420*h* comprising BPF 425*h,* D/C 427*h* and BPF 429*h,* which corresponds to Tx user beam C8. The signal for each of the reach-back channels is then fed into the LTWTA for the respective Tx user beam. For example, channel 420*a* is fed into the LTWTA 413 for the Tx user beam C1, and the corresponding Rx reach-back GW beam signal is transmitted to the cell C1 via the Tx user beam C1. Accordingly, a satellite terminal within the cell C1 can thereby receive data transmissions from a gateway within the cell A (see FIG. 3).

example, the GW 207, located within the spot-beam or cell A, for example, can transmit data via channels 420*a* to 420*h* to various terminals (e.g., ST 203 and St 205 within the cells C1 to C8). The satellite will receive the data signals transmitted by the GW 207 via the Rx reach-back GW beam A, and transmit the data signals back down to the cells C1 to C8 (e.g., to cell C1 via the Tx user beam C1). Similar to the mesh intra-beam communications from one St to another ST within the same cell, as would be recognized by one of skill in the art, the receiving terminals ST 203 and St 205 must each be equipped with a protocol for decoding the data signals to facilitate the recognition and consumption of the data. Such protocols would be a matter of design choice and would be within the realm of one of ordinary skill in the art. Further, various encryption and security architectures could be employed to ensure that only the desired terminal(s) are capable of receiving and decoding the data transmissions—such as conditional access and shared key architectures—which would also be a matter of design choice and within the realm of one of ordinary skill in the art.

According to a further example embodiment, with reference to FIG. 4C, the inter-beam communications for outroute signals transmitted by the satellite to an individual beam or cell are accomplished via a direct-through transponder path for the particular cell, where signals destined for that cell are received by the satellite via respective user receive beams (the Rx user beams C1 to C8), and are routed through the transponder for transmission via the transmission beam serving the destination cell (e.g., reach-back outroute data signals, received from terminals within the cells C1 to C8 via the respective Rx user beams C1 to C8, which are destined for a gateway (GW) of a cell via the respective transmit (Tx) reach-back gateway (GW) beam). For example, as depicted in FIG. 4A, a signal path from the LNA of each of the Rx user beams C1 to C8 is fed to a respective signal path for the Tx reach-back GW beam A. Similar to the signal paths for the Rx reach-back GW beam A, each signal path of the Tx reach-back GW beam A comprises a band pass filter (431*a* to 431*h*), a downconverter (433*a* to 433*h*) and a further band pass filter (435*a* to 435*h*). The signal from each of the respective Rx user beams C1 to C8 is then fed through the LTWTA 437 and the band pass filter 439 for transmission to cell A via the Tx reach-back GW beam A. Accordingly, a gateway within the cell A can thereby receive data transmissions from satellite terminals within the cells C1 to C8. Additionally, according to a further embodiment, as further illustrated by FIG. 4C, the Tx reach-back GW beam A utilizes the transmit section of the transponder 445 for the Rx/Tx beam B (which services the Tx user beam (Beam B) wherein the target reach-back GW is accessible/located.

Accordingly, via a single hop over the satellite a gateway in cell A of FIG. 3 can communicate with any terminal in cell A (via an intra-cell communication through the loop-back configuration of the transponders), and with any terminal in the cells C1 to C8 (via an inter-cell communication through the direct-through configuration of the transponders). Additionally, a terminal in any cell (e.g., in cell C1) can communication with any other terminal outside the cell C1 (e.g., a terminal in cell C5), via a double-hop through a reach back gateway. By proper frequency planning and transponder beam connectivity design, both loop-back and direct-through reach-back transponders can be optimally arranged.

Referring back to FIG. 3, the satellite 201 includes a further antenna represented by the coverage of cell B. Cell B may be implemented as providing an additional, or redundant, reach-back GW beam, or may be configured and operate as a further Tx and Rx user beam. Depending on the scenario, therefore, similar architectures as those depicted in FIGS. 4A to 4C would apply to the design and configuration of the third antenna serving cell B.

Further, the satellite system architecture of example embodiments of the present invention is not limited to a three reflector satellite configuration. Such architectures are also not limited to only a single antenna reflector configured as a cluster of beams, nor is any such reflector cluster limited to 8 beams. According to example embodiments, the architecture is scalable to different numbers of satellite antennas and antenna configurations, subject to certain tradeoffs, whereby increasing numbers and complexity of antenna configurations leads to larger and more complex satellite designs and the associated design challenges. Accordingly, a balance will exist between the number and configuration of the satellite antennas, and acceptable levels of design complexity, expense and time to market—which are also driven by particular system requirements. System requirements for enhanced capacity and larger footprints, however, can be met with multiple smaller and less complex satellite designs in accordance with the architectures of example embodiments of the present invention.

Moreover, the nature of such a satellite architecture and design facilitates rapid and reliable manufacturing and launch, with the ability of locating multiple satellites close to each other. This provides redundancy and support for covering hot spots with significantly higher capacity density, without suffering an unacceptable degradation of isolation and interference. This combined with the use of steerable reflectors facilitates the relocation of Tx and Rx user beams from an adjacent satellite to quickly and dynamically increase the hot spot capacity within a region when needed. The use of steerable beams in such a small satellite option provides for enhanced adaptability and flexibility that can react to rapid changes in coverage requirements.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A transmission and reception spot beam antenna apparatus, comprising:

a first transponder configured to receive one or more wireless communications signals from within a first receive spot beam of the transponder and to transmit one or more of the wireless communications signals within a first transmit spot beam of the transponder;

a second transponder configured to receive one or more reach-back signals from within a second receive spot beam and to process the reach-back signals for transmission; and a link between the second transponder and the first transponder, wherein the link between the second transponder and the first transponder is configured to pass one or more of the reach-back signals processed by the second transponder to the first transponder for transmission within the first transmit spot beam.

2. The transmission and reception spot beam antenna apparatus of claim 1, wherein:

the one or more wireless communications signals received by the first transponder from within the first receive spot beam comprise user terminal communications signals received via one or more communications channels of the first receive spot beam;

the one or more reach back signals received by the second transponder from within the second receive spot beam comprise gateway terminal reach-back signals intended for transmission to user terminals via one or more communications channels of the first transmit spot beam; and the link between the second transponder and the first transponder facilitates direct transmission of the gateway terminal reach-back signals, via the transmission and reception spot beam antenna apparatus, via the one or more communications channels of the first transmit spot beam.

3. The transmission and reception spot beam antenna apparatus of claim 1, wherein:

the first transponder comprises a first receive amplifier section, a first filter/down-converter processing section and a first transmit processing section;

the second transponder comprises a second receive amplifier section and a second filter/down-converter processing section, wherein the second filter/down-converter processing section is configured to perform the processing of the one or more reach-back signals being passed on to the first transponder; and the link between the second transponder and the first transponder is configured to pass the reach-back signals (being passed on to the first transponder) from the second filter/down-converter processing section of the second transponder to the first transmit processing section of the first transponder for the transmission within the first transmit spot beam.

4. The transmission and reception spot beam antenna apparatus of claim 1, further comprising:

one or more additional transponders, each being configured to receive one or more wireless communications signals from within a respective receive spot beam of the transponder and to transmit one or more of the wireless communications signals within a respective transmit spot beam of the transponder;

one or more additional links, each additional link being between the second transponder and a respective one of one or more of the additional transponders, wherein each additional link is configured to pass one or more of the reach-back signals processed by the second transponder to the respective additional transponder for transmission within the transmit spot beam of the respective additional transponder.

5. The transmission and reception spot beam antenna apparatus of claim 4, wherein:

each of the additional transponders comprises a respective receive amplifier section, a respective filter/down-converter processing section and a respective transmit processing section;

the second transponder comprises a plurality of filter/down-converter processing paths, wherein each filter/down-converter processing path is associated with a respective one of the additional links and is configured to process the reach-back signals being passed on to the respective additional transponder via the respective additional link;

each of the additional links is configured to pass the reach-back signals (being passed on to the respective additional transponder) from the respective filter/down-converter processing path to the transmit processing section of the respective additional transponder for the transmission within the transmit spot beam of the respective additional transponder.

6. The transmission and reception spot beam antenna apparatus of claim 1, further comprising:

a third transponder configured to receive one or more wireless communications signals from within a third receive spot beam of the transponder and to transmit one or more of the wireless communications signals within a third transmit spot beam of the transponder; and a link between the first transponder and the third transponder, wherein the link between the first transponder and the third transponder is configured to pass one or more of the wireless communications signals received by the first transponder to the third transponder;

wherein the third transponder is further configured to process the wireless communications signals (received via the link) for transmission within the third transmit spot beam.

7. The transmission and reception spot beam antenna apparatus of claim 6, wherein:

the one or more wireless communications signals received by the third transponder from within the third receive spot beam comprise user terminal communications signals received via one or more communications channels of the third receive spot beam;

the wireless communications signals received by the first transponder and passed on to the third transponder comprise user terminal reach-back signals intended for transmission to one or more reach-back gateway terminals via one or more communications channels of the third transmit spot beam; and the link between the first transponder and the third transponder facilitates direct transmission of the user terminal reach-back signals, via the transmission and reception spot beam antenna apparatus, via the one or more communications channels of the third transmit spot beam.

8. The transmission and reception spot beam antenna apparatus of claim 6, wherein:

the first transponder comprises a first receive amplifier section, a first filter/down-converter processing section and a first transmit processing section;

the third transponder comprises a third receive amplifier section, a third filter/down-converter processing section, a fourth filter/down-converter processing section, and a third transmit processing section;

the link between the first transponder and the third transponder is configured to pass the wireless communications signals (being passed on to the third transponder) from the first receive amplifier section of the first transponder to the fourth filter/down-converter processing section of the third transponder; and the fourth filter/down-converter processing section of the third transponder is configured to process the wireless communications signals passed on from the first transponder and to forward the processed signals to the third transmit processing section for the transmission within the third transmit spot beam.

9. The transmission and reception spot beam antenna apparatus of claim 6, further comprising:

one or more additional transponders, each being configured to receive one or more wireless communications signals from within a respective receive spot beam of the transponder and to transmit one or more of the wireless communications signals within a respective transmit spot beam of the transponder;

one or more additional links, each additional link being between a respective one of one or more of the additional transponders and the third transponder, wherein each additional link is configured to pass one or more of the wireless communications signals received by the respective additional transponder to the third transponder for transmission within the third transmit spot beam;

wherein the third transponder is further configured to process the wireless communications signals (received via each of the additional links) for transmission within the third transmit spot beam.

10. The transmission and reception spot beam antenna apparatus of claim 9, wherein:

the first transponder comprises a first receive amplifier section, a first filter/down-converter processing section and a first transmit processing section;

the third transponder comprises a third receive amplifier section, a third filter/down-converter processing section, and a third transmit processing section;

the third transponder further comprises a plurality of filter/down-converter processing paths, wherein each filter/down-converter processing path is associated with a respective one of the additional links and is configured to process the wireless communications signals passed on from the respective additional transponder via the respective additional link;

each of the additional links is configured to pass the wireless communications signals (being passed on to the third transponder) to the respective filter/down-converter processing section of the third transponder associated with the additional link; and each of the filter/down-converter processing sections of the third transponder is configured to process the wireless communications signals passed on from the respective additional transponder and to forward the processed signals to the third transmit processing section for the transmission within the third transmit spot beam.

* * * * *